United States Patent [19]

Koike et al.

[11] Patent Number: 5,075,699

[45] Date of Patent: Dec. 24, 1991

[54] INK JET RECORDING PROCESS EMPLOYING AN INK FOR USE IN INK JET RECORDING

[75] Inventors: Shoji Koike, Yokohama; Yasuko Tomida, Atsugi, both of Japan

[73] Assignee: Canon Kabushiki Kaisha, Tokyo, Japan

[21] Appl. No.: 528,473

[22] Filed: May 25, 1990

Related U.S. Application Data

[62] Division of Ser. No. 128,262, Dec. 1, 1987, Pat. No. 4,957,553.

[30] Foreign Application Priority Data

Dec. 1, 1986 [JP] Japan ................... 61-287183
Dec. 1, 1986 [JP] Japan ................... 61-287184

[51] Int. Cl.$^5$ .................... C09D 11/02; B41J 2/01
[52] U.S. Cl. ........................................ 346/1.1
[58] Field of Search ................ 346/1.1, 140 PD; 106/20, 22

[56] References Cited

U.S. PATENT DOCUMENTS

| | | | |
|---|---|---|---|
| 3,705,043 | 12/1972 | Zabiak | 106/20 |
| 3,846,141 | 11/1974 | Ostergren et al. | 106/22 |
| 3,870,528 | 3/1975 | Edds et al. | 106/22 |
| 4,196,007 | 4/1980 | Mansukhani | 106/22 |
| 4,239,544 | 12/1980 | Strem | 106/22 |
| 4,508,570 | 4/1985 | Fujii et al. | 106/20 |
| 4,512,807 | 4/1985 | Ogawa et al. | 106/22 |
| 4,585,484 | 4/1986 | Haruta et al. | 106/22 |
| 4,655,834 | 4/1987 | Haruta et al. | 106/20 |
| 4,724,001 | 2/1988 | Ohta et al. | 106/22 |
| 4,726,844 | 2/1988 | Greenwood | 106/22 |
| 4,737,190 | 4/1988 | Shimada et al. | 106/22 |
| 4,750,937 | 6/1988 | Botros | 106/22 |
| 4,765,838 | 8/1988 | Ohata et al. | 106/22 |
| 4,849,770 | 7/1989 | Koike et al. | 106/22 |
| 4,923,515 | 5/1990 | Koike et al. | 106/22 |
| 4,957,553 | 9/1990 | Koike et al. | 106/20 |

FOREIGN PATENT DOCUMENTS 55-145774  11/1980  Japan.
57-92068    6/1982  Japan.

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

An ink for ink-jet recording is provided which comprises a coloring matter, a water-soluble organic solvent, 75 to 90% by weight of water, and a material having a solubility to water of 0.1% or more and having a defoaming performance, and so prepared that the stability of foam judged according to JIS K 3362 after 5 minutes may be 0 mm. An ink-jet recording process employing the ink is also provided.

29 Claims, No Drawings

INK JET RECORDING PROCESS EMPLOYING AN INK FOR USE IN INK JET RECORDING

This application is a division of allowed application Ser. No. 128,262 filed Dec. 1, 1987, now U.S. Pat. No. 4,957,553.

BACKGROUND OF THE INVENTION

1. Field of the Invention

The present invention relates to an ink suited for an ink-jet recording method of carrying out the recording by causing droplets to fly from orifices of a recording head, and an ink-jet recording process employing the same. More particularly, it is concerned with ink for ink-jet recording that can achieve a superior high frequency response and ejection stability and also a superior print quality and fixing performance, and also an ink-jet recording process employing the same.

2. Description of the Related Art

In ink-jet recording methods, ink droplets are formed according to various ink ejection methods, and a part, or the whole, thereof is adhered on a recording medium such as paper, coated paper, plastic film, cloth, etc. to effect the recording. As the ink used for such an ink-jet recording method, there have been known and used those obtained by dissolving or dispersing every sort of dyes or pigments in a liquid medium.

What are required in such ink in relation also to the recording medium are the performances as follows:

(1) no feathering occurs on the printed part on the recording medium;
(2) ink can be immediately dried on the recording medium (including the case when dried by absorption);
(3) nozzles of a printer may not be clogged even when the printing is interrupted for a while;
(4) ink can achieve a good ink ejection frequency response matched to the printing speed of a printer;
(5) ink has high storage stability;
(6) ink is highly safe; etc.

To satisfy the various required performances as mentioned above, a variety of studies has been carried out in respect of additives such as organic solvents and surface active agents as the liquid medium, or further in respect of the values for properties such as viscosity and surface tension of ink, and considerable effect has been realized depending on what performance is required.

However, at present, noted as strongly required performances in using the above conventional ink are the following two points, on which intensive studies have also been made. That is to say;

(1) the development of the ink that can be adapted to a high speed recording; and
(2) the development of the ink that may not cause any feathering on a recording medium on which fibers are exposed.

Firstly, in respect of the improvement in the printing speed of a printer, a greater part of the approaches thereto have been made from the standpoint of mechanics such as head construction, and in fact not so many studies have been made on the improvement in the ejection frequency response attributable to the ink.

In general, the frequency response can be improved with decrease in the viscosity of ink, accompanied, however, with a lowering of the stability of ejection. Accordingly, in the present state of the art, it is difficult to develop such ink that can improve the frequency response while retaining the ejection stability. In particular, there is caused the problem such that the frequency response and the ejection stability becomes inferior under the condition of the driving at a frequency of 1 kHz or more. This tendency may become more remarkable with increase in the drive frequency to 2 kHz, 4 kHz and so on, raising a serious problem particularly in the ink-jet recording method utilizing a piezoelectric device or a heat energy.

Secondly, in respect of the feathering or the drying performance on the recording medium on which the fibers are exposed, there may be caused the problem such that the feathering of ink occurs along the fibers of the paper particularly when the printing was performed on ordinary paper such as copying paper, bond paper and report paper used as the recording medium, or a sizing agent contained in the ordinary paper affects the fixing performance to make it insufficient.

Thus, attempts have been already made for a method of carrying out the recording with use of ink whose pH was controlled to make the ink strongly alkaline for the purpose of preventing the feathering and improving the fixing performance (for example, Japanese Patent Laid-open Publication No. 57862/1981), a method of carrying out the recording with use of ink to which a large amount of surface active agent has been added (for example, Japanese Patent Laid-open Publication No. 29546/1980), and so forth. However, the method of carrying out the recording by controlling the pH to make the ink strongly alkaline can be dangerous if the ink is touched by hands, and also has disadvantages such that both the prevention of feathering and the improvement of drying performance can not be favorably achieved for the paper employing a certain kind of the sizing agent. In respect of the method of carrying out the recording with use of the ink to which a large amount of surface active agent has been added, there can be seen the troubles such that the feathering very frequently occurs depending on the kind of paper used, or the ink backward moves from the face of an orifice depending on the conditions for a print head, resulting in no ejection of ink, or, on the contrary, the whole face of the orifice is wetted resulting also in no ejection of ink.

SUMMARY OF THE INVENTION

Accordingly, a principal object of the present invention is to provide an ink having a good frequency response and ejection stability under a high frequency, and an ink-jet recording process that can achieve a higher printing speed.

Another object of the present invention is to provide ink for ink-jet recording that can obtain prints of a higher fixing speed and of less feathering even on the ordinary paper such as copy paper, bond paper and report paper comprising a recording face on which fibers are exposed and further having been sized, and an ink-jet recording process employing the same.

As a result of intensive studies made by the present inventors for achieving the above objects, they knew that the achievement of both the superior frequency response and stable ejection performance under the condition of the driving at a high frequency is very greatly affected by fine bubbles generated in the vicinity of a drive source for the ejection of ink or at the tip of nozzles and adhered on the side face of nozzles, and found that the adhering of such fine bubbles can be prevented by controlling the defoaming performance of the ink itself to a level not higher than a certain standard, and as a result the above problems can be solved. The present invention has thus been accomplished.

The present invention provides an ink for ink-jet recording, comprising a coloring matter, a water-soluble organic solvent, 75 to 90% by weight of water, and a material having a solubility to water of 0.1% or more and having a defoaming performance, and so prepared that the stability of foam judged according to JIS K 3362 after 5 minutes may be 0 mm.

The present invention also provides an ink-jet recording process, comprising carrying out the recording by ejecting droplets of ink from an orifice under a drive frequency of 1 kHz or more and adhering said droplets on a recording medium, wherein said ink comprises a coloring matter, a water-soluble organic solvent, 75 to 90% by weight of water, and a material having a defoaming performance and having a solubility to water of 0.1% or more, and is so prepared that the stability of foam judged according to JIS K 3362 after 5 minutes may be 0 mm.

DETAILED DESCRIPTION OF THE PREFERRED EMBODIMENTS

To describe the present invention in further detail, the defoaming performance of ink is greatly affected by the type of the dye to be used, organic solvent and surface active agent additionally contained, and the content of these, and also by the content of water.

In the present invention, in order to improve the permeability to ink, of ordinary paper on which cellulose fibers are exposed, and also lessen the feathering of ink thereon, the ink having a large content of water, i.e., a content of water ranging between 79 and 90% by weight, is used. Thus, the larger the content of water in the ink is, the more readily the fine bubbles may be generated, and therefore it become impossible to perform a stable ejection under the condition of the driving at a high frequency.

Even if a low-foaming surface active agent is added in order to solve this problem, the defoaming performance of the ink itself can not be improved because most of surface active agents usually used in the ink can be of a low-foaming property in nature, but have no defoaming performance, and moreover do not dissolve in water.

Now, the present inventors made intensive studies to obtain the ink that can be precisely adapted to the drive frequency more and more increased to 1 kHz, 2 kHz, 4 kHz and so on for improving the recording speed. As a result, they found that there is a very clear relation between the defoaming performance of the ink itself and the ejection stability of the ink under a high frequency, and reached the present invention.

This defoaming performance is a performance to be noted by taking account of the whole properties of the ink. Accordingly, the objects of the present invention can be achieved so long as the ink has an excellent defoaming performance as a whole even if, for example, the ink contains a surface active agent of a very high foaming power and a low defoaming power.

In the present invention, the method according to JIS K 3362-1978, Section 6.5 is employed as the method for judging the defoaming power.

This standard generally regulates a method for testing synthetic household detergents, and its outline is that 200 ml of a test solution having a given concentration is allowed to fall from a height of 900 mm in 30 minutes on the water surface under a given temperature condition to judge the height of foam seen after lapse of a given time.

In the present invention, the evaluation is made by setting the temperature condition to 25° C. and on the basis of the stability of foam (or the height of foam leveled by visual measurement) seen at the liquid surface after 1 minute and 5 minutes.

In the judgement according to the JIS K 3362, the ink having the stability of foam after 5 minutes, of more than 0 mm can not be expected to enable good recording over a long period of time even if the recording is performed by high frequency drive.

The ink so prepared that the stability of foam judged according to JIS K 3362 after 5 minutes may be 0 mm enables a stable ejection even under high-frequency drive, and also the ink so prepared that the stability of foam judged after 1 minute may be 5 mm or less, preferably 0 mm, enables a stable ejection even by the drive under a still higher frequency.

The respective components of the ink of the present invention will be described below.

The coloring matter constituting the ink of the present invention may include direct dyes, acidic dyes, food colors, basic dyes, reactive dyes, disperse dyes, vat dyes, solubilized vat dyes, reactive disperse dyes, oily dyes, and all sorts of pigments. Particularly preferred are water-soluble dyes in view of the performance of ink.

The content of these coloring matters may be determined depending on the kind of the liquid medium components, the properties required for the ink, etc., but, in general, they may be contained in an amount of 0.2 to 20% by weight, preferably 0.5 to 10% by weight, and more preferably 1 to 5% by weight, based on the total weight of the ink.

The liquid medium usable in the present invention, in which the coloring matter as mentioned above is dissolved or dispersed, may be any conventional media generally used in the media for the ink for ink-jet recording, preferably including, for example, water and/or organic solvents. The organic solvents may include alkyl alcohols having 1 to 5 carbon atoms, such as
  methyl alcohol, ethyl alcohol, n-propyl alcohol, isopropyl alcohol, n-butyl alcohol, sec-butyl alcohol, tert-butyl alcohol, isobutyl alcohol, n-pentanol, etc.;
amides such as dimethylformamide and dimethylacetamide;
ketones or ketoalcohols such as acetone and diacetone alcohol;
ethers such as tetrahydrofuran and dioxane;
polyalkylene glycols such as polyethylene glycol and polypropylene glycol;
alkylene glycols whose alkylene group contains 2 to 6 carbon atoms, such as ethylene glycol, propylene glycol, butylene glycol, triethylene glycol, 1,2,2-hexanetriol, thiodiglycol, hexylene glycol and diethylene glycol;
glycerol;
lower monoalkyl ethers of polyhydric alcohols, such as ethylene glycol monomethyl(or ethyl) ether, diethylene glycol monomethyl(or ethyl) ether and triethylene glycol monomethyl(or ethyl) ether;
lower dialkyl ethers of polyhydric alcohols, such as triethylene glycol dimethyl(or ethyl) ether and tetraethylene glycol dimethyl(or ethyl) ether; sulforan, N-methyl-2-pyrrolidone, 1,3-dimethyl-2-imidazolidinone, etc.

Of these organic solvents, lower alkyl alcohols having 5 or less carbon atom(s) can achieve the remarkable effect of promoting the defoaming of ink, and thus particularly preferable as the solvent used in the ink of the present invention.

These organic solvents may desirably be contained in an amount ranging between 2 and 15% by weight, preferably between 5 and 15% by weight, based on the total weight of the ink.

The liquid medium as described above can be used alone or as a mixture, but the liquid medium composition may most preferably comprise water and one or more of the organic solvents, wherein said solvent contains at least one of water-soluble high boiling solvents, for example, polyhydric alcohols such as diethylene glycol, propylene glycol and glycerol.

In the present invention, the defoaming performance of the ink can be improved by selecting and suitably combining the solvents as mentioned above, and its effect can be particularly remarkably exhibited by incorporating a material having a solubility to water of 0.1% or more and having a defoaming performance.

Such a material may include, for example, surface active agents having a high defoaming performance, secondary alcohol and/or ethylene oxide addition products thereof, acetylene alcohols and acetylene glycols.

The secondary alcohols or ethylene oxide addition products thereof used in the present invention may include 2-butanol, 2-pentanol, 3-pentanol, 2-hexanol, 3-hexanol, 2-methyl-4-hexanol, etc., ethylene oxide addition products thereof including, for example, Nikkol BT-9, BT-50 (all available from Nikko Chemicals Co., Ltd.), etc.

The acetylene alcohols and acetylene glycols used in the present invention may include those not particularly limited so long as they contain an acetylene bond —C≡C— and a hydroxyl group —OH, but more preferably include the compounds represented respectively by Formula (I) and (II) following.

$$R_1-\underset{\underset{OH}{|}}{\overset{\overset{R_2}{|}}{C}}-C\equiv C-R_3 \quad (I)$$

$$R_4-\underset{\underset{OH}{|}}{\overset{\overset{R_5}{|}}{C}}-C\equiv C-\underset{\underset{OH}{|}}{\overset{\overset{R_6}{|}}{C}}-R_7 \quad (II)$$

wherein $R_1$ to $R_7$ each represent any one of an alkyl group or alkoxy group having 1 to 4 carbon atoms, or a hydrogen atom.

Examples of the compound represented by Formula (I) or (II) are shown below.

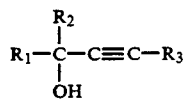  No. 1

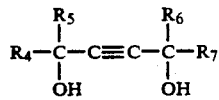  No. 2

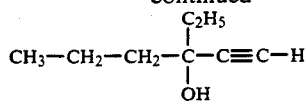  No. 3

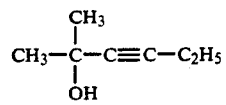  No. 4

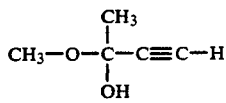  No. 5

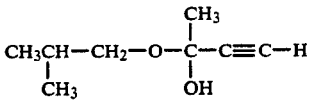  No. 6

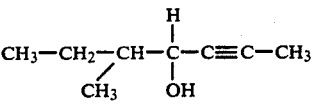  No. 7

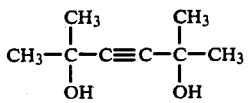  No. 8

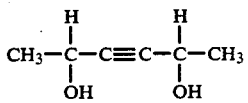  No. 9

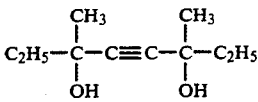  No. 10

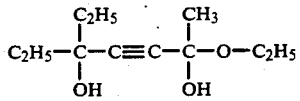  No. 11

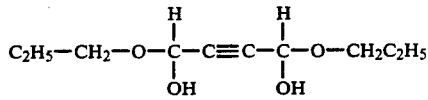  No. 12

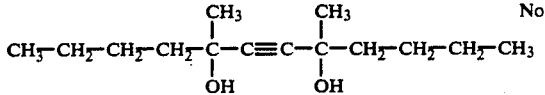  No. 13

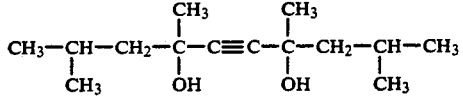  No. 14

These compounds may be added in the ink of the present invention alone or in combination when used.

These compounds may desirably be added in an amount of 0.05 to 10% by weight, more preferably 0.1 to 5% by weight, based on the total weight of the ink.

Of these compounds, the addition of acetylene alcohol or acetylene glycol can be effective.

Addition of these acetylene alcohol and/or acetylene glycol can be effective not only to improve the above frequency response and ejection stability, but also to improve the fixing performance or print grade of the ink on the recording medium of the type comprising a recording face on which fibers are exposed, particularly to improve the fixing performance of the ink on the sized ordinary paper generally use, typified by copying paper, report paper, bond paper and continuous business form paper, and the print grade thereof such that less feathering may occur and dot edges can be sharp.

It is still not clear why the addition of acetylene alcohol and/or acetylene glycol can bring about the effect particularly excellent in respect of the ejection stability or the fixing performance or print grade on the recording medium, but, when compared with other surface active agents, such effect can be presumed to be attributable to the acetylene bond —C≡C— contained in the structure thereof. It is considered that the presence of the acetylene bond improves the affinity with the structural materials for the print head, particularly the nozzles, to improve the frequency response or the ejection stability. Similarly, it is presumed that the presence of the acetylene bond improves the affinity with the recording medium such as paper, particularly the recording medium containing a sizing agent (desirably of 30 to 200 g/m$^2$ in basis weight and 100 seconds or less in the degree of sizing) to improves the fixing performance, and also make it possible to obtain prints of a high quality.

The essential components for the ink of the present invention are as described above, but any other material such as a dispersing agent, a surface active agent, a viscosity modifier, a surface tension modifier a brightening agent can be optionally added.

For example, there may be included a viscosity modifier such as polyvinyl alcohol, cellulose or its derivative, and a water-soluble resin, any sort of surface active agent of cationic, anionic or nonionic type; surface tension modifiers such as diethanolamine and triethanolamine; pH adjusters utilizing buffer solutions, mildew-proofing agents, etc.

To prepare ink used in an ink-jet recording process of the type in which the ink is electrified, added are specific resistance regulators such as inorganic salts, e.g., lithium chloride, ammonium chloride and sodium chloride. For the use of the ink for an ink-jet recording process of a type in which the ink is ejected by the action of a heat energy, it may be sometimes practiced to control the thermal properties (for example, specific heat, thermal expansion coefficient, thermal conductivity, etc.).

The ink for ink-jet recording of the present invention as described above, as it is particularly used under the (maximum) drive frequency of 1 kHz or more, preferably 2 kHz or more, and more preferably 4 kHz or more, is desired to have the physical properties controlled to have preferably a surface tension of 35 to 65 dyne/cm and a viscosity of 15 cP or less, more preferably a viscosity of 3 cP or less, at 25° C.

The ink used in the present invention and obtained in the above manner, in which the problems involved in the prior arts have been sufficiently solved, can be excellent as being well-balanced as such in the recording performances, in particular, the frequency response, stability in the formation of droplets, ejection stability, continuous recording performance over a long period of time, ink ejection stability achievable after the operation is interrupted over a long period of time, etc. Accordingly, it can be useful as the ink for ink-jet recording of every type, and particularly suitable as the ink for the ink-jet rocording method of the on-demand type that requires a high frequency, thus making it possible to give excellent records.

It can be also excellent as being well-balanced in the fixing performance and print grade when printed on the recording medium, particularly the ordinary paper such as copying paper, bond paper and report paper comprising a recording face on which fibers are exposed, which is further sized, thus making it possible to give excellent records.

The present invention will be described below in greater detail by giving Examples and Comparative Examples.

In the following, part(s) and % are based on weight.

EXAMPLES 1 TO 5

Preparation of Ink

The components shown below were mixed and stirred for 3 hours. The resulting solution was adjusted to pH 7.5 with use of an aqueous 0.1% sodium hydroxide solution, followed by filtering under pressure with use of Fluoropore Filter (trade name, produced by Sumitomo Electric Industries, Ltd.) of 1 μm in pore size to obtain ink (A) to ink (E) of the present invention.

Physical properties (at 25° C.) of the ink thus obtained and the stability of foam judged according to JIS K 3362 after 5 minutes and after 1 minute are shown in Table 1 following.

| Ink (A) (Example 1) | |
|---|---|
| C.I. Food Black 2 | 3 parts |
| Glycerol | 10 parts |
| Ethylene glycol | 10 parts |
| Exemplary Compound No. 1 | 0.4 part |
| Urea | 1 part |
| Water | 79 parts |
| Ink (B): (Example 2) | |
| C.I. Direct Black 154 | 5 parts |
| Diethylene glycol | 17 parts |
| Ethylene glycol | 5 parts |
| Exemplary Compound No. 2 | 0.3 part |
| Water | 78 parts |
| Ink (C): (Example 3) | |
| C.I. Acid Red 35 | 2 parts |
| Glycerol | 10 parts |
| 1-3-Dimethyl-2-imidazolidinone | 10 parts |
| Exemplary Compound No. 10 | 0.5 part |
| Ethylene glycol monophenyl ether | 0.5 parts |
| Water | 80 parts |
| Ink (D): (Example 4) | |
| C.I. Direct Blue 86 | 3 parts |
| Triethylene glycol | 5 parts |
| Diethylene glycol | 5 parts |
| Ethylene glycol | 10 parts |
| Exemplary Compound No. 5 | 0.4 part |
| Morpholine stearate | 0.1 part |
| Water | 80 parts |
| Ink (E): (Example 5) | |
| C.I. Direct Yellow 86 | 2 parts |
| Glycerol | 11 parts |
| N-methyl-2-pyrrolidone | 7 parts |
| Exemplary Compound No. 4 | 0.2 part |
| Exemplary Compound No. 11 | 0.3 part |
| Ethyl alcohol | 3 parts |
| Water | 79 parts |

COMPARATIVE EXAMPLES 1 TO 3

Preparation of Ink

Following entirely the same procedure as in Examples 1 to 5, all components shown below were treated to obtain comparative ink (F) to ink (H).

| Ink (F): (Comparative Example 1) | |
|---|---|
| C.I. Food Black 2 | 3 parts |
| Glycerol | 10 parts |
| Ethylene glycol | 7 parts |
| Urea | 1 part |
| Water | 82 parts |
| Ink (G): (Comparative Example 2) | |
| C.I. Reactive Red 24 | 2 parts |
| Diethylene glycol | 17 parts |
| Ethylene glycol | 5 parts |
| Ethylene glycol monophenyl ether | 2 parts |
| Water | 78 parts |
| Ink (H): (Comparative Example 3) | |
| C.I. Direct Yellow 142 | 3 parts |
| Glycerol | 12 parts |
| Ethylene glycol | 5 parts |
| N-methyl-2-pyrrolidone | 5 parts |
| Nonionic surface active agent [Nissan Nonion P223 (trade name), available from Nippon Oil & Fats Co., Ltd.] | 0.2 part |
| Water | 78 parts |

TABLE 1

| | Ink | Surface tension (dyne/cm) | Viscosity (c.P.) | *Stability of foam After 5 minutes | After 1 minute |
|---|---|---|---|---|---|
| Example: | | | | | |
| 1 | (A) | 41 | 2.1 | A | B |
| 2 | (B) | 45 | 2.2 | A | A |
| 3 | (C) | 46 | 2.0 | A | A |
| 4 | (D) | 43 | 2.3 | A | B |
| 5 | (E) | 44 | 2.2 | A | A |
| Comparative Example: | | | | | |
| 1 | (F) | 66 | 2.0 | C | C |
| 2 | (G) | 48 | 2.2 | C | C |
| 3 | (H) | 43 | 2.2 | C | C |

*Stability of foam:
A ... 0 mm
B ... 0 to 5 mm
C ... more than 5 mm

EXAMPLES 6 TO 20 AND COMPARATIVE EXAMPLES 4 TO 12

Using ink (A) to ink (H) obtained in Examples 1 to 5 and Comparative Example 1 to 3, and using printer (a) or printer (b) shown below, whose frequency was set in the range of 1 to 6 kHz, solid prints of $15 \times 4$ cm$^2$ in area and character prints of 130 alphabets were obtained on commercially available copying paper to examine ink follow-up performances and shooting point precision to evaluate the frequency response of the ink. Results of the evaluation are shown in Table 2.

Printer (a)

An ink-jet printer utilizing a heating device (heater size: $30 \times 150$ μm$^2$) as an energy source for the ejection of ink and having 24 nozzles of $40 \times 50$ μm$^2$ in orifice size (drive voltage: 24.5 V).

Printer (b)

An ink-jet printer utilizing a piezoelectric device as a means for the pressure applied to ink, ejecting the ink by causing a mechanical displacement in the piezoelectric device by electrical signals, and having 8 nozzles of 50 μm in orifice diameter and 40 mm in flow path length (drive voltage: 60 V).

In Examples and Comparative Examples in which the drive frequency was set to 2 kHz and printer (a) above was used as an ink-jet recording apparatus, printing was performed on commercially available copying paper and bond paper to evaluate the fixing performance and print dot quality of the resulting prints. Results of the evaluation are shown in Table 3.

TABLE 2

| | Ink | Frequency (kHz) | Recording apparatus | Frequency [1] response |
|---|---|---|---|---|
| Example: | | | | |
| 6 | (A) | 1 | (a) | A |
| 7 | (A) | 2 | (a) | A |
| 8 | (A) | 4 | (a) | A |
| 9 | (B) | 2 | (a) | A |
| 10 | (B) | 4 | (a) | A |
| 11 | (B) | 6 | (a) | A |
| 12 | (C) | 1 | (b) | A |
| 13 | (C) | 2 | (a) | A |
| 14 | (C) | 4 | (b) | B |
| 15 | (D) | 2 | (a) | A |
| 16 | (D) | 4 | (a) | A |
| 17 | (D) | 6 | (a) | B |
| 18 | (E) | 2 | (a) | A |
| 19 | (E) | 4 | (b) | A |
| 20 | (E) | 6 | (b) | B |
| Comparative Example: | | | | |
| 4 | (F) | 1 | (b) | C |
| 5 | (F) | 2 | (a) | C |
| 6 | (F) | 4 | (b) | D |
| 7 | (G) | 1 | (a) | C |
| 8 | (G) | 2 | (a) | C |
| 9 | (G) | 3 | (a) | D |
| 10 | (H) | 2 | (a) | C |
| 11 | (H) | 4 | (a) | C |
| 12 | (H) | 6 | (a) | D |

[1] Evaluation of frequency response:
The state of printing of the resulting prints, i.e., blurs or white-spottings, and the state of shooting point such as splashes or twists were observed by naked eyes and evaluated.

A ... The following-up of ink to the frequency is in a good state, and no blur or white-spotting and shooting point inferiority are seen in both the solid prints and character prints.

B ... The following-up of ink to the frequency is almost in a good state, and no blur or white-spotting and shooting point inferiority are seen in the character prints, but blurs are slightly seen in the solid prints.

C ... No blur or white-spotting is seen but shooting point inferiority is seen in part in the character prints. In the solid prints, blurs and white-spottings are seen in about ¼ of the hole solid.

D ... Blurs and white-spottings are seen in large numbers in the solid prints, and blurs and shooting point inferiority are also seen in large numbers in the character prints.

TABLE 3

| | Ink | Fixing performance [2] copying paper | Bond paper | Print dot grade [3] copying paper | Bond paper |
|---|---|---|---|---|---|
| Example: | | | | | |
| 7 | (A) | A | B | A | A |
| 9 | (B) | A | A | A | A |
| 13 | (C) | A | A | B | A |
| 15 | (D) | A | B | B | A |
| 18 | (E) | A | A | A | A |
| Comparative Example: | | | | | |
| 5 | (F) | C | D | A | A |
| 8 | (G) | A | A | D | C |

TABLE 3-continued

| | Ink | Fixing performance *2 | | Print dot grade *3 | |
| --- | --- | --- | --- | --- | --- |
| | | copying paper | Bond paper | copying paper | Bond paper |
| 10 | (H) | B | B | D | D |

*2 Evaluation of fixing performance:
Printing was performed on commercially available copying paper and bond paper, and the printed part was rubbed after 10 seconds and after 30 seconds with filter paper (trade name: No. 5C; available from Toyo Kagakusangyo Co., Ltd.). (Evaluated under the environmental conditions of 25° C. and 60% RH.)
A ... No blur when rubbed after 10 seconds.
B ... Blurs in small numbers when rubbed after 10 seconds.
C ... Blurs in small numbers when rubbed after 30 seconds.
D ... Blurs in large numbers when rubbed after 30 seconds.
*3 Evaluation of print dot quality:
Printing was performed on the copying paper and bond paper mentioned above, and the prints were left for more than 1 hour, and thereafter the feathering and the sharpness of edges in the dot level were evaluated. (Evaluated under the environmental conditions of 25° C. and 60% RH.)
A ... No feathering is seen, with very sharp edges.
B ... Feathering is seen more or less, but with sharp dot edges.
C ... Feathering is seen in almost all of the dots, also with edges a little indistinct.
D ... Feathering is seen in all of the dots, also with unclear edges.

EXAMPLES 21 TO 24

Preparation of Ink

The components shown below were mixed and stirred for 3 hours. The resulting solution was adjusted to pH 7.5 with use of an aqueous 0.1% sodium hydroxide solution, followed by filtering under pressure with use of Fluoropore Filter (trade name, produced by Sumitomo Electric Industries, Ltd.) of 1 μm in pore size to obtain ink (I) to ink (L) of the present invention.

Physical properties (at 25° C.) of the ink thus obtained and the stability of foam judged according to JIS K 3362 after 5 minutes and after 1 minute are shown in Table 4.

| Ink (I) (Example 21) | |
| --- | --- |
| C.I. Food Black 2 | 3 parts |
| Diethylene glycol | 15 parts |
| Ethylene glycol | 5 parts |
| Ethanol | 5 parts |
| Nonionic surface active agent | 0.1 part |
| (trade name: Surfinol 440; available from Nisshin Chemical Co., Ltd.) | |
| Water | 75 parts |
| Ink (J): (Example 22) | |
| C.I. Direct Black 154 | 5 parts |
| Glycerol | 8 parts |
| Ethylene glycol | 12 parts |
| Methanol | 5 parts |
| Nonionic surface active agent | 1 part |
| (trade name: Nikkol BT-50; available from Nikko Chemicals Co., Ltd.) | |
| Water | 80 parts |
| Ink (K): (Example 23) | |
| C.I. Acid Red 35 | 2 parts |
| Glycerol | 10 parts |
| 1-3-Dimethyl-2-imidazolidinone | 10 parts |
| Isopropanol | 5 part |
| Tetraethylene glycol dimethyl ether | 1 part |
| Ethylene glycol monophenyl ether | 0.5 part |
| Water | 80 parts |
| Ink (L): (Example 24) | |
| C.I. Direct Blue 86 | 3 parts |
| Triethylene glycol | 5 parts |
| Diethylene glycol | 5 parts |
| Ethylene glycol | 10 parts |
| Ethanol | 7 parts |
| Nonionic surface active agent | 0.1 part |
| (trade name: Surfinol 465; available from Nisshin Chemical Co., Ltd.) | |
| Water | 80 parts |

COMPARATIVE EXAMPLES 13 TO 15

Preparation of Ink

Following entirely the same procedures as in Examples 21 to 24, all components shown below were treated to obtain comparative ink (M) to ink (O).

Physical properties (at 25° C.) of the ink thus obtained and the stability of foam judged according to JIS K 3362 after 5 minutes and after 1 minute are shown in Table 4.

| Ink (M): (Comparative Example 13) | |
| --- | --- |
| C.I. Food Black 2 | 3 parts |
| Diethylene glycol | 15 parts |
| Ethylene glycol | 5 parts |
| Urea | 1 part |
| Water | 80 parts |
| Ink (N): (Comparative Example 14) | |
| C.I. Reactive Red 24 | 2 parts |
| Glycerol | 8 parts |
| Ethylene glycol | 12 parts |
| Water | 80 parts |
| Ink (O): (Comparative Example 15) | |
| C.I. Direct Yellow 142 | 3 parts |
| Glycerol | 12 parts |
| Ethylene glycol | 5 parts |
| N-methyl-2-pyrrolidone | 5 parts |
| Nonionic surface active agent | 0.1 part |
| (trade name: Nikkol BWA-40; available from Nikko Chemicals Co., Ltd.) | |
| Water | 78 parts |

TABLE 4

| | Ink | Surface tension (dyne/cm) | Viscosity (c.P.) | *Stability of foam | |
| --- | --- | --- | --- | --- | --- |
| | | | | After 5 minutes | After 1 minute |
| Example: | | | | | |
| 21 | (I) | 37 | 2.0 | A | B |
| 22 | (J) | 39 | 2.5 | A | A |
| 23 | (K) | 42 | 2.3 | A | A |
| 24 | (L) | 37 | 2.7 | A | B |
| Comparative Example: | | | | | |
| 13 | (M) | 61 | 2.0 | C | C |
| 14 | (N) | 66 | 2.2 | C | C |
| 15 | (O) | 48 | 2.2 | C | C |

EXAMPLES 25 TO 36 AND COMPARATIVE EXAMPLE 16 TO 24

Using ink (I) to ink (O) obtained in Examples 21 to 24 and Comparative Examples 13 to 15, and using printer (a) or printer (b) shown previously, whose frequency was set in the range of 1 to 6 kHz, solid prints of 15×4 cm² in area and character prints of 130 alphabets were obtained on commercially available copying paper to examine ink follow-up performances and shooting point precision to evaluate the frequency response of the ink. Results of the evaluation are shown in Table 5.

TABLE 5

| | Ink | Frequency (kHz) | Recording apparatus | Frequency *1 response |
| --- | --- | --- | --- | --- |
| Example: | | | | |
| 25 | (I) | 1 | (a) | A |
| 26 | (I) | 2 | (a) | A |
| 27 | (I) | 4 | (a) | B |
| 28 | (J) | 2 | (a) | A |
| 29 | (J) | 4 | (a) | A |
| 30 | (J) | 6 | (a) | A |
| 31 | (K) | 1 | (b) | A |

TABLE 5-continued

| Ink | Frequency (kHz) | Recording apparatus | Frequency *1 response |
|---|---|---|---|
| 32 (K) | 2 | (b) | A |
| 33 (K) | 4 | (b) | A |
| 34 (L) | 2 | (a) | A |
| 35 (L) | 4 | (a) | B |
| 36 (L) | 6 | (a) | B |
| Comparative Example: | | | |
| 16 (M) | 1 | (b) | C |
| 17 (M) | 2 | (b) | C |
| 18 (M) | 4 | (b) | D |
| 19 (N) | 1 | (a) | C |
| 20 (N) | 2 | (a) | C |
| 21 (N) | 4 | (a) | D |
| 22 (O) | 2 | (a) | C |
| 23 (O) | 4 | (a) | C |
| 24 (O) | 6 | (a) | D |

The ink of the present invention is greatly superior in the frequency response and ejection performance as compared with the conventional ink. Accordingly, it becomes possible to carry out stable printing at a high speed according to a high drive frequency.

In addition, when the recording is carried out on the ordinary paper such as copying paper, bond paper and report paper comprising a recording face on which fibers are exposed and further having been sized, little feathering of dots is seen on the recording medium, and prints with sharp edges can be also obtained, and moreover a good fixing performance can be achieved.

What is claimed is:

1. An ink-jet recording process, comprising the steps of:
   (a) ejecting droplets of ink from an orifice under a drive frequency of 1 kHz or more, wherein said ink comprises a coloring matter, a water-soluble organic solvent, 75 to 90% by weight of water, and a material having a defoaming performance and having a solubility to water of 0.1% or more, and wherein said ink has a foam stability according to JIS K 3362 of 0 mm after five minutes; and
   (b) adhering said droplets onto a recording medium.

2. The ink-jet recording process of claim 1, wherein said drive frequency is 2 kHz or more.

3. The ink-jet recording process of claim 1, wherein said drive frequency is 4 kHz or more.

4. The ink-jet recording process of claim 1, wherein said drive frequency is 6 kHz or more.

5. The ink-jet recording process of claim 1, wherein said droplets of ink are ejected according to an on-demand method.

6. The ink-jet recording process of claim 1, wherein said droplets of ink are formed according to a method in which a piezoelectric device is used.

7. The ink-jet recording process of claim 1, wherein said droplets of ink are formed according to a method utilizing the action of a heat energy.

8. The ink-jet recording process of claim 1, wherein said recording medium is a sheet of sized paper.

9. The ink-jet recording process of claim 1, wherein the ink is so prepared that the stability of foam judged according to JIS K 3362 after 1 minute may be 5 mm or less.

10. The ink-jet recording process of claim 1, wherein the ink is so prepared that the stability of foam judged according to JIS K 3362 after 1 minute may be 0 mm.

11. The ink-jet recording process of claim 1, wherein said material having a defoaming performance is any one of a secondary alcohol and/or an ethylene oxide addition product thereof, acetylene alcohol and acetylene glycol.

12. The ink-jet recording process of claim 11, wherein said acetylene alcohol and acetylene glycol are the compounds represented respectively by Formula (I) and (II) following:

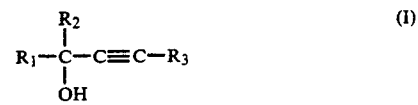

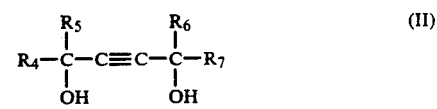

wherein $R_1$ to $R_7$ each represent any one of an alkyl group or alkoxy group having 1 to 4 carbon atoms, or a hydrogen atom.

13. The ink-jet recording process of claim 1, wherein said material having a defoaming performance is contained in an amount ranging between 0.01 and 10% by weight based on the total weight of the ink.

14. The ink-jet recording process of claim 1, wherein said ink has a surface tension of 35 to 65 dyne/cm and a viscosity of 15 cP or less at 25° C.

15. The ink-jet recording process of claim 1, wherein said ink has a surface tension of 35 to 65 dyne/cm and a viscosity of 3 cP or less at 25° C.

16. A process according to claim 1, wherein said water-soluble organic solvent is selected from the group consisting of amides, ketones, ketoalcohols, ethers, polyalkylene glycols, alkylene glycols, glycerol, lower monoalkyl ethers of polyhydric alcohols, lower dialkyl ethers of polyhydric alcohols, sulforan, N-methyl-2-pyrrolidone, 1,3-dimethyl-2-imidazolidinone, methanol, ethanol, n-propanol, n-butanol, tert-butanol and n-pentanol, and wherein said defoaming material is selected from the group consisting of (i) a secondary alcohol selected from the group consisting of isopropanol, 2-butanol, 2-pentanol, 3-pentanol, 2-hexanol, 3-hexanol and 2-methyl-4-hexanol, (ii) an ethylene oxide addition product thereof, (iii) a mixture of (i) and (ii), (iv) an acetylene alcohol, and (v) an acetylene glycol.

17. A process according to claims 16, wherein the ink has a stability of foam judged according to JIS K 3362 after one minute of 5 mm or less.

18. A process according to claim 16, wherein said ink has a stability of foam judged according to JIS K 3362 after one minute of 0 mm.

19. A process according to claim 16, wherein said acetylene alcohol and acetylene glycol are compounds represented respectively by Formula (I) and (II) below:

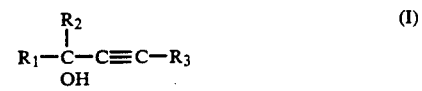

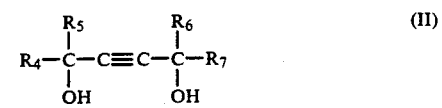

wherein $R_1$ to $R_7$ each represent any one of an alkyl group or alkoxy group having 1 to 4 carbon atoms, or a hydrogen atom.

20. A process according to claim 16, wherein said defoaming material is contained in an amount between 0.01 and 10 percent by weight based on the total weight of the ink.

21. A process according to claim 16, wherein said ink has a surface tension of 35–65 dyne/cm and a viscosity of 15 cP or less at 25° C.

22. A process according to claim 16, wherein said ink has a surface tension of 35–65 dyne/cm and a viscosity of 3 cP or less at 25° C.

23. A process according to claim 1, wherein said ink comprises 1–5% by weight of a water soluble dye and 2–15% by weight of said water-soluble organic solvent, said solvent being selected from the group consisting of amides, ketones, ketoalcohols, ethers, polyalkylene glycols, alkylene glycols, glycerol, lower monoalkyl ethers of polyhydric alcohols, lower dialkyl ethers of polyhydric alcohols, sulforan, N-methyl-2-pyrrolidone, 1,3-dimethyl-2-imidazolidinone, methanol, ethanol, n-propanol, n-butanol, tert-butanol and n-pentanol and wherein said defoaming material is selected from the group consisting (i) a secondary alcohol selected from the group consisting of isopropanol, 2-butanol, 2-pentanol, 3-pentanol, 2-hexanol, 3-hexanol and 2-methyl-4-hexanol, (ii) an ethylene oxide addition product thereof, (iii) and acetylene alcohol, and (iv) an acetylene glycol.

24. A process according to claim 23, wherein said ink has a foam stability according to JIS K 3362 after one minute of 5 mm or less.

25. A process according to claim 23, wherein said ink has a foam stability according to JIS K 3362 after one minute of 0 mm.

26. A process according to claim 23, wherein said acetylene alcohol and acetylene glycol are compounds represented respectively by Formula (I) and (II) below:

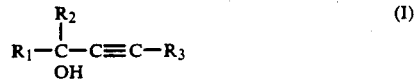

(I)

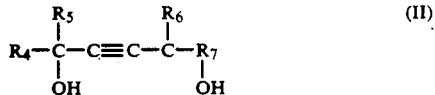

(II)

wherein $R_1$ to $R_7$ are each an alkyl group, an alkoxy group having 1 to 4 carbon atoms or a hydrogen atom.

27. A process according to claim 23, wherein said defoaming material is contained in an amount between 0.01 and 10% by weight based on the total weight of said ink.

28. A process according to claim 23, wherein said ink has a surface tension of 35–65 dyne/cm and a viscosity of 15 cP or less at 25° C.

29. A process according to claim 23, wherein said ink has a surface tension of 35–65 dyne/cm and a viscosity of 3 cP or less at 25° C.

* * * * *

UNITED STATES PATENT AND TRADEMARK OFFICE
CERTIFICATE OF CORRECTION

PATENT NO. : 5,075,699
DATED : December 24, 1991
INVENTOR(S) : Koike et al.

It is certified that error appears in the above-identified patent and that said Letters Patent is hereby corrected as shown below: Title page:

Item (54) and column 1, lines 2-3, change "INK JET" (both occ.) to --INK-JET--

[57] ABSTRACT:

The Abstract should read: --An ink-jet recording process employing an ink comprising a coloring matter, a water-soluble organic solvent, 75 to 90 % by weight of water, and a material having a solubility to water of 0.1 % or more and having a defoaming performance, and so prepared that the stability of foam judged according to JIS K 3362 after 5 minutes may be 0 mm.--.

COLUMN 3:

Line 33, "79" should read --75--.

COLUMN 4:

Line 56, "1,2,2-hex-" should read -- 1,2,6-hex- --.

COLUMN 7:

Line 29, after "modifier" (2nd occurrence) insert --, and--.
Line 59, "arts" should read --art--.

COLUMN 9:

Line 43, "Example" should read --Examples--.

UNITED STATES PATENT AND TRADEMARK OFFICE
CERTIFICATE OF CORRECTION

PATENT NO. : 5,075,699
DATED : December 24, 1991
INVENTOR(S) : Koike et al.

It is certified that error appears in the above-identified patent and that said Letters Patent is hereby corrected as shown below:

COLUMN 10:

Line 48, "hole" should read --whole--.

COLUMN 12:

Line 48, "EXAMPLE" should read --EXAMPLES--.

COLUMN 14:

Line 48, "claims 16," should read --claim 16,--;
Lines 60-63"

(I)"

should read

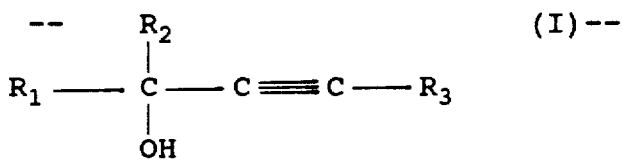   (I)--

UNITED STATES PATENT AND TRADEMARK OFFICE
CERTIFICATE OF CORRECTION

PATENT NO. : 5,075,699

DATED : December 24, 1991

INVENTOR(S) : Koike et al.

It is certified that error appears in the above-identified patent and that said Letters Patent is hereby corrected as shown below:

COLUMN 16:

Lines 11-14,"
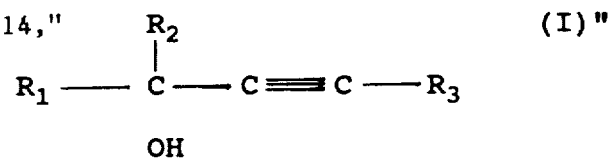
(I)"

should read

--
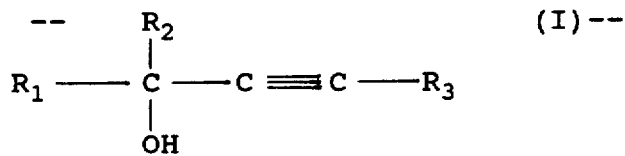
(I)--

Signed and Sealed this

Ninth Day of November, 1993

BRUCE LEHMAN

*Attest:*

*Attesting Officer*      *Commissioner of Patents and Trademarks*